Figure 1:
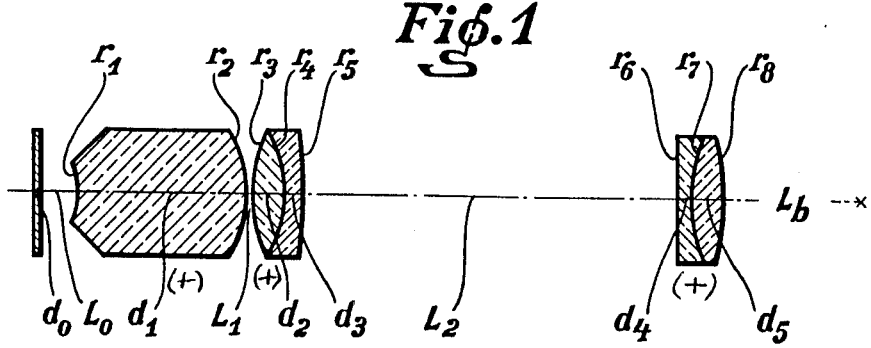

July 26, 1955  W. KLEIN  2,713,808
MICROSCOPE OBJECTIVE
Filed May 13, 1953

Walter Klein  INVENTOR.

BY Ivon E. G. Kringsburg

United States Patent Office 2,713,808
Patented July 26, 1955

2,713,808

MICROSCOPE OBJECTIVE

Walter Klein, Dutenhofen, Kr. Wetzlar, Germany, assignor to Ernst Leitz, G. m. b. H., a corporation of Germany Application May 13, 1953, Serial No. 354,705

Claims priority, application Germany June 16, 1952

4 Claims. (Cl. 88—57)

This invention relates to improvements in microscope objectives of the character disclosed in the pending U. S. patent application Serial Number 235,132 filed July 5, 1951, now Patent No. 2,644,362, dated July 7, 1953. The disclosed objective system has a thick meniscus front lens which forms a negative factor in the Petzval sum of the entire system and is utilized to compensate for the positive factors of other elements of the system. This negative factor becomes greater in proportion as the radius of the front surface becomes smaller. This causes considerable astigmatism because the latter increases as the said radius is made smaller. The astigmatism might perhaps be lessened by decreasing the distance to the object but this is not desirable. For this reason the said disclosed objective system uses a dispersing cemented surface within a convergent lens, said surface being concave towards the object and the convergent lens is followed by a negative lens on the image side of the cemented surface.

The lens elements in said disclosed system which are positioned near the image side of the system and which include the said negative lens and other lenses may be arranged in different ways as described in the said application. The object of this invention is to provide an improved microscope objective over that disclosed in the said application and the invention comprises a system in which the said negative lens near the image side has cemented thereto on its image side another lens element. This has, among other features, the advantage of eliminating the reflections which occur on the negative lens.

The invention is embodied in a microscope objective in which a cemented lens consisting of the said negative lens and on the image side thereof at least one positive lens is positioned at a distance of at least 15 millimeters from the said concave cemented surface which follows the front thick meniscus and the difference in the Nu-values of the glass types used in the said cemented lens is smaller than 20.

Inasmuch as this second cemented surface in the system is also utilized to compensate for the astigmatism, the refractive indexes of the lenses on opposite sides of this second cemented surface are admittedly large, but their influence on the chromatic axial deviation is small because the great distance between the front and the rear portions of the optical system requires that the front portion must be chromatically corrected by itself. This in turn demands a small difference in the Nu-values.

From the examples hereinafter set forth it will be seen that the leveling of the image field and the correction for astigmatism are obtained with very low values of the Seidel sums $\Sigma P$ and $\Sigma \Gamma$. The usual fine corrections do not essentially influence the invention.

Figure 2:
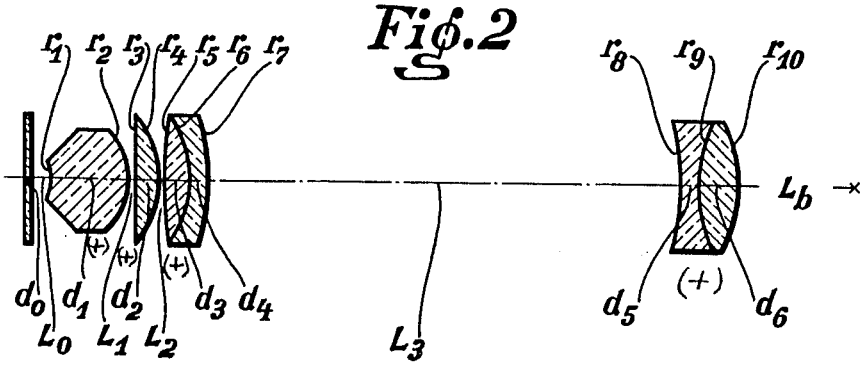
Figure 3:
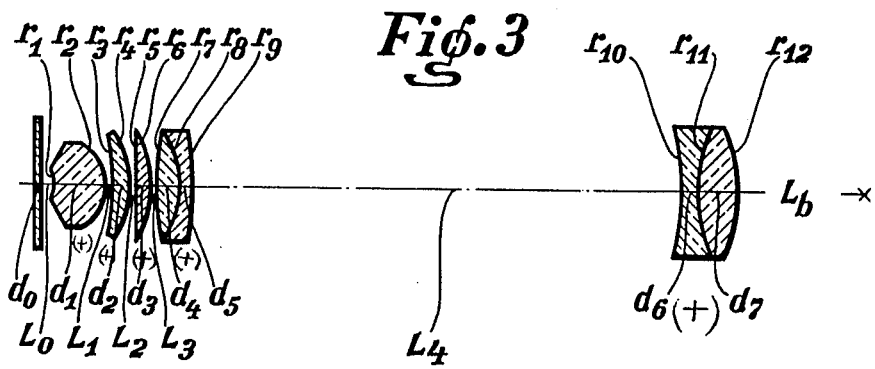

In the accompanying drawing Figs. 1, 2 and 3 illustrate in axial sections calculated examples of the invention corresponding to the tables of values appearing hereinafter in the description of each of the figures which are also included in the claims which are to be read accordingly. In the tables of values the dimensional and optical details are enumerated and identified as follows:

$d_0$=front cover glass
$L$=distance between elements
$L_b$=distance of the image
$d$=thickness of lens
$r$=radius of the refracting lenses the subscript numerals counting from the front
$n_d$=refractive index
$Nu$=Abbe's number
$\beta'_e$=magnification of the $e$-line
$f_e$=focal length for the $e$-line
$A$=aperture
$\Sigma P$=Seidel coefficient for the Petzval sum
$\Sigma \Gamma$=Seidel coefficient for astigmatism The radii, distances $L$ and the thicknesses of lenses $d$ are given in millimeters.

Fig. 1 illustrates a microscope objective embodying the invention in which the optical elements shown in the drawing are characterized by the following values:

| | | $n_d$ | Nu |
|---|---|---|---|
| | $d_0=$ 0.17 | | |
| | $L_0=$ 2.4162 | | |
| $r_1=-$ 3.9 | | | |
| | $d_1=$ 11.1 | 1.6676 | 41.9 |
| $r_2=-$ 6.77 | | | |
| | $L_1=$ 0.3 | | |
| $r_3=+10.0$ | | | |
| | $d_2=$ 2.0 | 1.3921 | 99.8 |
| $r_4=-$ 7.0 | | | |
| | $d_3=$ 1.0 | 1.7015 | 41.1 |
| $r_5=-50.0$ | | | |
| | $L_2=$ 24.0 | | |
| $r_6=\infty$ | | | |
| | $d_4=$ 1.0 | 1.6676 | 41.9 |
| $r_7=+10.0$ | | | |
| | $d_5=$ 2.0 | 1.5014 | 56.5 |
| $r_8=-16.485$ | | | |
| | $L_b=154$ | | |

$\beta'_e=9.9951 \quad f_e=14.9965 \quad A=0.25$
$\Sigma P=-0.0124 \quad \Sigma \Gamma=-0.0140$ Fig. 2 illustrates a microscope objective embodying the invention in which the optical elements shown in the drawings are characterized by the following values:

| | | $n_d$ | Nu |
|---|---|---|---|
| | $d_0=$ 0.17 | 1.5228 | 58.5 |
| | $L_0=$ 1.1229 | | |
| $r_1=-$ 2.11 | | | |
| | $d_1=$ 5.1 | 1.6910 | 54.8 |
| $r_2=-$ 4.0 | | | |
| | $L_1=$ 0.5 | | |
| $r_3=\infty$ | | | |
| | $d_2=$ 1.4 | 1.4339 | 95.2 |
| $r_4=-$ 6.665 | | | |
| | $L_2=$ 0.05 | | |
| $r_5=+41.46$ | | | |
| | $d_3=$ 2.0 | 1.4339 | 95.2 |
| $r_6=-$ 6.07 | | | |
| | $d_4=$ 1.0 | 1.7283 | 28.3 |
| $r_7=-14.44$ | | | |
| | $L_3=$ 30.5 | | |
| $r_8=-16.9$ | | | |
| | $d_5=$ 1.0 | 1.6910 | 54.8 |
| $r_9=+10.0$ | | | |
| | $d_6=$ 2.5 | 1.5001 | 61.6 |
| $r_{10}=-$ 8.84145 | | | |
| | $L_b=152.0$ | | |

$\beta'_e=24.7422 \quad f_e=7.3871 \quad A=0.50$
$\Sigma P=-0.0234 \quad \Sigma \Gamma=+0.0593$ Fig. 3 illustrates a microscope objective embodying the invention in which the optical elements shown in the drawing are characterized by the following values:

|  |  | $n_d$ | Nu |
|---|---|---|---|
|  | $d_0=$ 0.17<br>$L_0=$ 0.6696 | 1.5228 | 58.5 |
| $r_1 =-$ 1.36 | $d_1=$ 3.35 | 1.6910 | 54.8 |
| $r_2 =-$ 2.72 | $L_1=$ 0.3 |  |  |
| $r_3 =-17.76$ | $d_2=$ 0.9 | 1.4339 | 95.2 |
| $r_4 =-$ 5.89 | $L_2=$ 0.05 |  |  |
| $r_5 = \infty$ | $d_3=$ 1.0 | 1.4339 | 95.2 |
| $r_6 =-$ 6.665 | $L_3=$ 0.05 |  |  |
| $r_7 =+26.0$ | $d_4=$ 1.6 | 1.4339 | 95.2 |
| $r_8 =-$ 4.983 | $d_5=$ 0.8 | 1.7283 | 28.3 |
| $r_9 =-15.0$ | $L_4=$ 33.0 |  |  |
| $r_{10}=-22.11$ | $d_6=$ 1.0 | 1.6910 | 54.8 |
| $r_{11}=+11.02$ | $d_7=$ 2.5 | 1.5001 | 61.6 |
| $r_{12}=-11.02$ | $L_b=152.0$ |  |  |

$\beta'_e=39.9929 \quad f_e=4.6960 \quad A=0.65$
$\Sigma P=-0.0501 \quad \Sigma \Gamma=+0.0139$ The invention is not limited to the exact values set forth in the foregoing specification or in the appended claims. It is known in this art that changes in a stated value may be made and compensated for by a corresponding change in another related value. I claim therefore all such changes and modifications as come within the principle of the invention and the scope of the appended claims.

I claim:
1. A microscope objective consisting of two groups of lens elements, the first group consisting of a thick meniscus front lens, a converging lens element on the image side of said thick meniscus, a dispersing cemented surface within said converging lens element, said dispersing surface being concave toward the thick meniscus for correcting the astigmatism caused by said thick meniscus; said second group consisting of a single lens element having a cemented surface within the same convex toward the said thick meniscus, said single lens element consisting of a negative lens on the object side of said convex surface and a positive lens on the image side of said convex cemented surface, the said second group being spaced an uninterrupted distance of at least fifteen millimeters away from the cemented surface in the said first group for correcting the astigmatism and coma, the said front lens being the only thick meniscus in the said objective.

2. Microscope objective comprising a thick meniscus front lens, a convergent lens on the image side of said thick meniscus, a dispersing cemented surface within said convergent lens, said dispersing surface being concave towards said thick meniscus, the latter being the only thick meniscus in said objective, a second cemented lens spaced a distance of at least fifteen millimeters from the said dispersing cemented concave surface, said second cemented lens comprising a negative lens on the object side thereof and at least one positive lens on the image side theeorf, the difference in the Nu-values of the glasses used in said second cemented lens being less than twenty, characterized by the following data:

|  |  | $n_d$ | Nu |
|---|---|---|---|
|  | $d_0=$ 0.17<br>$L_0=$ 2.4162 |  |  |
| $r_1 =-$ 3.9 | $d_1=$ 11.1 | 1.6676 | 41.9 |
| $r_2 =-$ 6.77 | $L_1=$ 0.3 |  |  |
| $r_3 =+10.0$ | $d_2=$ 2.0 | 1.3921 | 99.8 |
| $r_4 =-$ 7.0 | $d_3=$ 1.0 | 1.7015 | 41.1 |
| $r_5 =-50.0$ | $L_2=$ 24.0 |  |  |
| $r_6 = \infty$ | $d_4=$ 1.0 | 1.6676 | 41.9 |
| $r_7 =+10.0$ | $d_5=$ 2.0 | 1.5014 | 56.5 |
| $r_8 =-16.485$ | $L_b=154$ |  |  |

$\beta'_e=9.9951 \quad f_e=14.9965 \quad A=0.25$
$\Sigma P=-0.0124 \quad \Sigma \Gamma=-0.0140$ in which table of data ($f_e$) is the focal length for the $e$-line; A is the aperture; P the Seidel coefficient for the Petzval sum; $\Gamma$ the Seidel coefficient for the astigmatism; ($r$) written with subscript numerals designates the radius of the refracting lens surfaces counting from the front; in like manner ($d$) designates the lens thicknesses; (L) designate the axial distances between lenses or components and ($n_d$) indicates refractive indexes. Nu designates Abbe's number, $\beta'_e$ magnification for the $e$-line, $L_b$ the distance of the image.

3. Microscope objective comprising a thick meniscus front lens, a convergent lens on the image side of said thick meniscus, a dispersing cemented surface within said convergent lens, said dispersing surface being concave towards said thick meniscus, the latter being the only thick meniscus in said objective, a second cemented lens spaced a distance of at least fifteen millimeters from the said dispersing cemented concave surface, said second cemented lens comprising a negative lens on the object side thereof and at least one positive lens on the image side thereof, the difference in the Nu-values of the glasses used in said second cemented lens being less than twenty, characterized by the following data:

|  |  | $n_d$ | Nu |
|---|---|---|---|
|  | $d_0=$ 0.17<br>$L_0=$ 1.1229 | 1.5228 | 58.5 |
| $r_1 =-$ 2.11 | $d_1=$ 5.1 | 1.6910 | 54.8 |
| $r_2 =-$ 4.0 | $L_1=$ 0.5 |  |  |
| $r_3 = \infty$ | $d_2=$ 1.4 | 1.4339 | 95.2 |
| $r_4 =-$ 6.665 | $L_2=$ 0.05 |  |  |
| $r_5 =+41.46$ | $d_3=$ 2.0 | 1.4339 | 95.2 |
| $r_6 =-$ 6.07 | $d_4=$ 1.0 | 1.7283 | 28.3 |
| $r_7 =-14.44$ | $L_3=$ 30.5 |  |  |
| $r_8 =-16.9$ | $d_5=$ 1.0 | 1.6910 | 54.8 |
| $r_9 =+10.0$ | $d_6=$ 2.5 | 1.5001 | 61.6 |
| $r_{10}=-$ 8.84145 | $L_b=152.0$ |  |  |

$\beta'_e=24.7422 \quad f_e=7.3871 \quad A=0.50$
$\Sigma P=-0.0234 \quad \Sigma \Gamma=+0.0593$ in which table of data ($f_e$) is the focal length for the $e$-line; A is the aperture; P the Seidel coefficient for the Petzval sum; $\Gamma$ the Seidel coefficient for the astigmatism; ($r$) written with subscript numerals designates the refracting lens surfaces counting from the front; in like manner ($d$) designates the lens thicknesses; (L) designates the axial distances between the lenses and components and ($n_d$) indicates refractive indexes, Nu designates Abbe's number, $\beta'_e$ magnification for the $e$-line, $L_b$ the distance of the image.

4. Microscope objective comprising a thick meniscus front lens, a convergent lens on the image side of said thick meniscus, a dispersing cemented surface within said convergent lens, said dispersing surface being concave towards said thick meniscus, the latter being the only thick meniscus in said objective, a second cemented lens spaced a distance of at least fifteen millimeters from the said dispersing cemented concave surface, said second cemented lens comprising a negative lens on the object side thereof and at least one positive lens on the image side thereof, the difference in the Nu-values of the glasses used in said second cemented lens being less than twenty, characterized by the following data:

|   |   | $n_d$ | Nu |
|---|---|---|---|
| | $d_0=$ 0.17 | 1.5228 | 58.5 |
| | $L_0=$ 0.6696 | | |
| $r_1 = -1.36$ | | | |
| | $d_1=$ 3.35 | 1.6910 | 54.8 |
| $r_2 = -2.72$ | | | |
| | $L_1=$ 0.3 | | |
| $r_3 = -17.76$ | | | |
| | $d_2=$ 0.9 | 1.4339 | 95.2 |
| $r_4 = -5.89$ | | | |
| | $L_2=$ 0.05 | | |
| $r_5 = \infty$ | | | |
| | $d_3=$ 1.0 | 1.4339 | 95.2 |
| $r_6 = -6.665$ | | | |
| | $L_3=$ 0.05 | | |
| $r_7 = +26.0$ | | | |
| | $d_4=$ 1.6 | 1.4339 | 95.2 |
| $r_8 = -4.983$ | | | |
| | $d_5=$ 0.8 | 1.7283 | 28.3 |
| $r_9 = -15.0$ | | | |
| | $L_4=$ 33.0 | | |
| $r_{10} = -22.11$ | | | |
| | $d_6=$ 1.0 | 1.6910 | 54.8 |
| $r_{11} = +11.02$ | | | |
| | $d_7=$ 2.5 | 1.5001 | 61.6 |
| $r_{12} = -11.02$ | | | |
| | $L_b=$ 152.0 | | |

$\beta'_e = 39.9929 \quad f_e = 4.6960 \quad A = 0.65$
$\Sigma P = -0.0501 \quad \Sigma \Gamma = +0.0139$ in which table of data $(f_e)$ is the focal length for the $e$-line; A is the aperture; P the Seidel coefficient for the Petzval sum; Γ the Seidel coefficient for the astigmatism; $(r)$ written with subscript numerals designates the refracting lens surfaces counting from the front; in like manner $(d)$ designates the lens thicknesses; (L) designates the axial distances between lenses and components and $(n_d)$ indicates refractive indexes. Nu designates Abbe's number, $\beta'_e$ magnification for the $e$-line $L_b$ the distance of the image.

References Cited in the file of this patent

UNITED STATES PATENTS

| | | |
|---|---|---|
| 1,578,259 | Boegehold | Mar. 30, 1926 |
| 1,761,441 | Foster | June 3, 1930 |
| 1,910,115 | Luboshez | May 23, 1933 |
| 2,050,024 | Sonnefeld | Aug. 4, 1936 |
| 2,206,255 | Boegehold | July 2, 1940 |
| 2,644,362 | Ravizza et al. | June 7, 1953 |